United States Patent [19]

Haugh

[11] 4,168,651
[45] Sep. 25, 1979

[54] TROPHY PLATE CENTERING DEVICE

[76] Inventor: James L. Haugh, 1210 W. 6, Topeka, Kans. 66606

[21] Appl. No.: 893,742

[22] Filed: Apr. 5, 1978

[51] Int. Cl.² .................. B23C 1/16; B23Q 15/00
[52] U.S. Cl. ......................... 409/86; 33/25 R; 33/191; 269/139
[58] Field of Search ............ 90/13.1; 33/25 R, 191; 269/139, 157, 321 T; 279/1 L, 106

[56] References Cited

U.S. PATENT DOCUMENTS

| | | | |
|---|---|---|---|
| 1,189,004 | 6/1916 | Scotfold | 269/157 X |
| 2,724,896 | 11/1955 | Mich | 33/25 R |

Primary Examiner—Z. R. Bilinsky
Attorney, Agent, or Firm—Robert K. Rhea

[57] ABSTRACT

A generally rectangular flat housing is connected with one clamp of a self-centering work holder of an engraving machine for movement therewith. The housing slidably and pivotally supports a plurality of links connecting a control shaft with a pair of spaced-apart arms journalled by the housing for movement toward and away from each other in a pivoting action by the control shaft. When moved toward each other, the arms contact the respective opposing ends of a trophy plate to be engraved when loosely supported by the work holder for centering the trophy plate on the work holder prior to the engraving action thereon.

5 Claims, 5 Drawing Figures

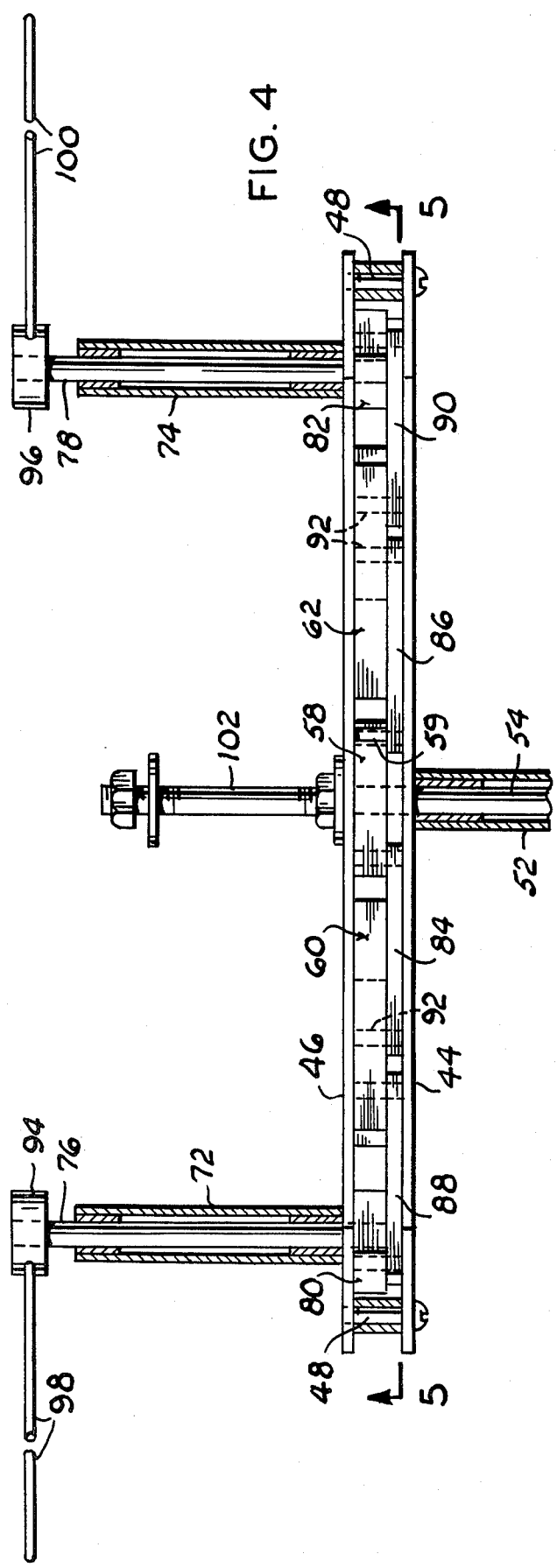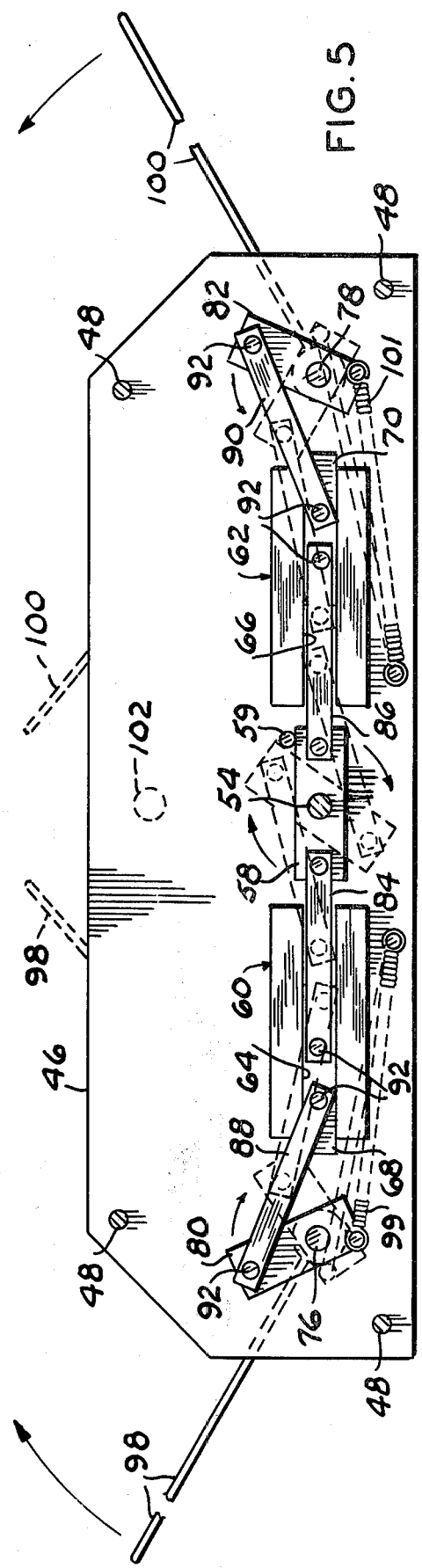

TROPHY PLATE CENTERING DEVICE

BACKGROUND OF THE INVENTION

1. Field of the Invention.

The present invention relates to engraving machines and more particularly to a trophy plate centering device.

Trophies, such as those received by the winner of an athletic event, are usually provided with a name plate on which the name, date etc. is engraved by an engraving machine before attaching the plate to the trophy. It is necessary, when positioning the plate on the engraving machine, that the plate be centered between end limits before engraving tool contact is made with the plate for proper spacing of the wording engraved thereon. Heretofor this has been a tedious and time consuming act for the reason no two plates are of equal dimensions and each must be measured and centered on the engraving machine each time a new plate is placed thereon. This invention provides such a centering tool and eliminates errors of measurement and ruining the plate as well as conserving time.

2. Description of the prior art.

Prior patents, such as U.S. Pat. No. 2,197,884 have generally related to holding devices for engraving an irregularly-shaped or longitudinally tapered member, or as in U.S. Pat. No. 1,889,660, for holding and rotating a disk while engraving the edge thereof. U.S. Pat. No. 3,956,828 discloses a stylus which permits moving the cutter to a new position on the work while the stylus remains in contact with a template while other patents, such as U.S. Pat. No. 2,838,838 and U.S. Pat. No. 3,453,933, relate to cutting or forming templates.

This invention is distinctive over these patents by providing an attachment for an engraving machine for accurately, easily and quickly centering an elongated flat plate to be engraved with respect to the work holding clamp of the engraving machine.

SUMMARY OF THE INVENTION

A generally rectangular thin walled hollow housing is mounted on one clamp of a self-centering work holder of an engraving machine. The housing slidably and rotatably journals a plurality of levers pivoted by a manually operated control shaft and connected with a pair of arms journalled by the housing for movement of the arms toward and away from each other in a direction parallel with the housing and transverse to the path of movement of the clamps of the engraver self-centering work holder. The arms, when moved toward each other by the control shaft, contact the respective opposing ends of a work plate to be engraved when loosely disposed on and supported by the engraver work holding clamps.

The principal object of this invention is to provide a trophy plate centering device for attachment to the work holder of an engraving machine.

BRIEF DESCRIPTION OF THE DRAWINGS

FIG. 4 is a fragmentary top view of the device, to another scale, partially in section, with the housing cover removed; and, FIG. 5 is a fragmentary elevational and cross sectional view taken substantially along the line 5—5 of FIG. 4 and illustrating, by dotted lines, the movement of sliding and pivoting links when the trophy plate centering arms have been moved toward each other.

DESCRIPTION OF THE PREFERRED EMBODIMENT

Figure 1:
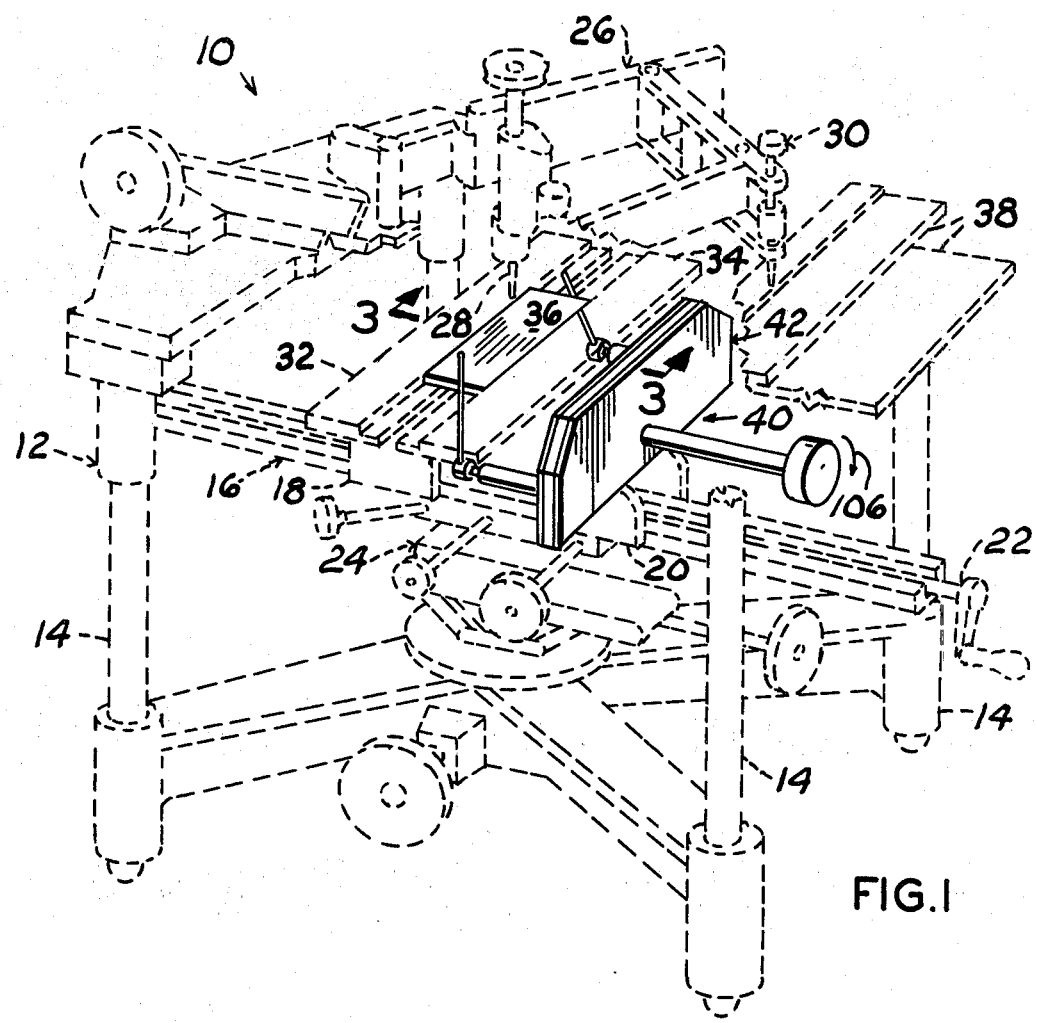
FIG. 1 is a perspective view of the device in operative position when mounted on a conventional engraving machine, the latter being shown by dotted lines.

Like characters of reference designate like parts in those figures of the drawings in which they occur.

In the drawings:

The reference numeral 10 indicates an engraving machine of the type presently marketed under the trademark Engravograph for engraving jewelry, trophies, or the like. The engraving machine comprises an open framework upright stand 12 having a plurality of legs 14 horizontally supporting a raceway 16 in turn supporting a pair of work holding clamps 18 and 20 movable toward and away from each other longitudinally of the raceway by a manually operated screw 22. The raceway 16 is supported within the framework 12 by members 24 permitting lateral movement of the raceway to center it with respect to the frame 12. The frame 12 also supports pantograph-type linkage or members 26 in turn supporting a motor driven cutter 28 and a stylus 30. The self-centering work holding clamps 18 and 20 respectively support a pair of work holding plates 32 and 34, having confronting rabbeted edges for supporting and gripping a plate-like workpiece 36. The frame also supports a template holding platen 38 for guiding the stylus 30 when the cutter 28 is placed in contact with the workpiece 36 by manual movement of the pantograph members 26.

The above description is conventional with this and other engraving machines and is set forth to show the operation and function of the trophy plate centering tool of the present invention when mounted thereon.

The numeral 40 indicates the trophy plate centering device, as a whole, which is relatively thin elongated rectangular in general configuration. The device 40 includes a housing 42 having plate-like opposing side walls 44 and 46 maintained in parallel spaced-apart relation by a plurality of bushings surrounded screws 48 (FIG. 4) with the top and ends of the housing enclosed by a strap metal cover 50 transversely extending between and gripped by the housing side plates 44 and 46 adjacent their marginal edges.

A control shaft support tube 52 is connected at one end to the outwardly disposed surface of the housing wall 44 normal to the plane thereof and medially its ends. A control shaft 54, having a control knob 56 secured to one end, is journalled at its other end portions by bushings within the support tube 52. The inwardly disposed end of the control shaft is secured to a rectangular control shaft block 58 medially its ends for rotation of the control block about the axis of the control shaft toward and away from a stop 59, as presently explained.

Two pairs of elongated guides 60 and 62 are longitudinally disposed horizontally in aligned equally spaced relation with respect to the inwardly disposed end portion of the control shaft 54 and are secured to the inner surface of the housing wall 46. One guide member of the respective pair of guides 60 and 62 is disposed in horizontal spaced relation above the other guide of each pair of guides to form a pair of horizontal open ended slots 64 and 66 in horizontal alignment with each other and the axis of the control shaft 54. A pair of slide members 68 and 70, each having a length less than the length of the guides forming the respective pair of guides 60 and 62, are slidably disposed for horizontal sliding movement within the respective slots 64 and 66.

A pair of arm shaft support tubes 72 and 74 are rigidly connected at one end to the outer surface of the housing wall 46 in equally spaced parallel relation on opposing sides of and in horizontal alignment with the longitudinal axis of the control shaft 54, when extended through and beyond the housing wall 46. A pair of arm support shafts 76 and 78 are respectively journalled by bushings for rotation about their longitudinal axes within the respective arm supports 72 and 74.

A pair of arm control blocks 80 and 82, disposed between the housing plates 44 and 46, are rigidly connected adjacent one end portion, in surrounding relation, to the respective arm control shaft 76 and 78 between the housing plates 44 and 46. A pair of control shaft links 84 and 86 are each pivotally connected at one end, respectively, to one end of the control shaft block 58 with the other respective end of each link 84 and 86 pivotally connected to the adjacent end portion of the respective slide 68 and 70. A pair of arm links 88 and 90 are pivotally connected, respectively, by one end portion to the other end portion of the respective slide 68 and 70. The opposite end of the respective arm link 88 and 90 is pivotally connected with the end portion of the respective arm control block 80 and 82 opposite the connection with the arm control shafts 76 and 78.

In the example shown, each link of the respective pairs of links 84-86 and 88-90 are formed by a strap-like metal member having a pair of pins 92 cooperatively projecting laterally from one flat surface of the strap-like member and normal to its longitudinal axis to form pivoting axes.

A pair of cylindrical lugs 94 and 96 are coaxially connected with the end of the respective control arm shaft 76 and 78 opposite the housing wall 46. A pair of rod-like arms 98 and 100 are rigidly connected at one end with the respective lug 94-96 in outwardly diverging relation, as viewed in FIG. 5.

A pair of springs 99 and 101, each connected at one end with the housing plate 46 and respectively connected at their other ends to the respective arm control block 80 and 82, normally bias the arms 98 and 100 and interconnected linkage toward the solid line position of FIG. 5.

A nut and washer equipped mounting bolt 102, projecting in a direction opposite the control shaft 54, is rigidly connected at one end normal to the plane of the housing wall 46 adjacent its upper limit and medially its length.

Figure 3:
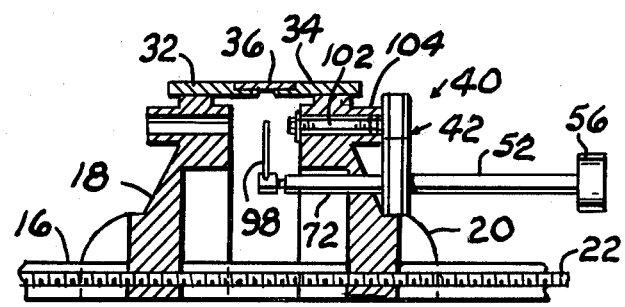
FIG. 3 is a fragmentary vertical cross sectional view, to a larger scale, partially in elevation, taken substantially along the line 3—3 of FIG. 1.

As best seen in FIG. 3, the housing 42 is vertically disposed edgewise and transversely supported by the work holding clamp 20 of the engraving machine with the mounting bolt 102 disposed within a centrally drilled boss 104 forming a part of the work holding clamp 20. The arm support shafts 74 and 72 are disposed in lateral spaced relation on opposing sides of the work holding clamp 20 with the arms 98 and 100 capable of entering the spacing between the work holding clamps 18 and 20 when the arms are rotated toward each other, as shown by dotted lines (FIG. 5), and as presently explained.

Operation

Figure 2:
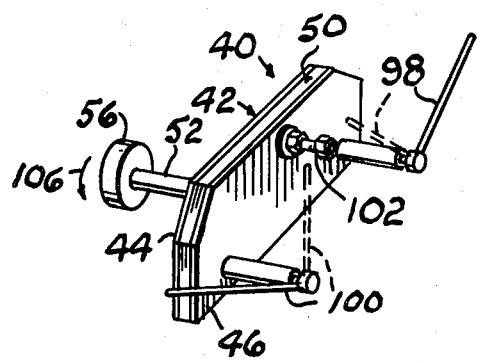
FIG. 2 is a perspective view of the opposite side of the device from that shown in FIG. 1.

With the device 40 installed on the engraving machine 10, the trophy plate 36 is loosely disposed on and supported by the rabbeted edges of the work support plates 32 and 34. The control knob 56 is manually rotated in the direction of the arrow 106 (FIGS. 1 and 2) which rotates the control block 58 clockwise, as viewed in FIG. 5, wherein the pairs of control shaft links 84 and 86 move the slides 68 and 70 toward each other so that the control arm links 88 and 90 pivot one end of the control arm blocks 80 and 82 toward the center of the housing thus rotating the control arm shafts 76 and 78 in unison and moving the arms 98 and 100 toward each other. The arms 98 and 100 respectively contact opposite end surfaces of the trophy plate 36 thus centering the trophy transversely of the horizontal axis of the raceway 16. Thereafter, the centering clamps 18 and 20 are moved toward each other by the screw 22 to grip the trophy plate 36 which is then engraved by the engraving machine in a conventional manner.

Obviously the invention is susceptible to changes or alterations without defeating its practicability. Therefore, I do not wish to be confined to the preferred embodiment shown in the drawings and described herein.

I claim:

1. In combination with an engraving machine of the pantograph type having a stylus and a power driven cutter and having a raceway slidably supporting work holding clamp members for movement of the clamp members toward and away from each other longitudinally of the raceway and supporting a workpiece plate to be engraved, the improvement comprising:
a generally rectangular housing including elongated opposing parallel side plates extending transversely of said raceway and secured to one said clamp member for movement therewith;
a control shaft projecting into said housing through one said side plate normal to the plane thereof;
an elongated control shaft block secured to said control shaft within said housing;
a pair of arm support shafts, each arm shaft of said pair of arm shafts having one end portion projecting into said housing in spaced parallel relation with respect to each other through the other said housing plate normal to the plane thereof;
a pair of elongated arm control blocks, each block of said pair of blocks having one end portion secured to the respective arm shaft of said pair of arm support shafts within said housing;
arm means respectively secured, in normally outwardly diverging relation, to the end portions of said arm control shafts opposite said housing; and,
link means pivotally connecting said control shaft block with said arm control blocks for angular rotation of said arm support shafts in opposing directions and moving said arms toward each other and contacting opposing end surfaces of said workpiece plate when loosely supported by said clamp members in response to angular rotation of said control shaft in one direction.

2. The combination according to claim 1 and further including:
stop means within said housing for limiting angular rotation of said control shaft block to less than 360°.

3. The combination according to claim 2 and further including:
resilient means connected with said arm control blocks for normally biasing said arms away from opposing end surfaces of a workpiece plate supported by said clamp members.

4. The combination according to claim 2 or 3 in which said link means includes:
two pairs of elongated guides secured within said housing in longitudinally spaced relation for forming a pair of longitudinally aligned slots;
a slide member reciprocably supported by each slot;
a pair of control shaft links respectively connecting one end portion of each said slide member with respective end portions of said control block; and,
a pair of arm links respectively connecting the other end portion of each said slide member with one end portion of the other end portion of said arm control blocks.

5. The combination according to claim 4, further comprising:
support tube means secured to said housing for journalling said control shaft and said arm support shafts; and,
a control knob secured to the end of said control shaft opposite said housing.

* * * * *